Dec. 8, 1959     G. J. ANDREINI     2,916,336
PRELOADED ROLLER BEARINGS
Filed Aug. 8, 1958
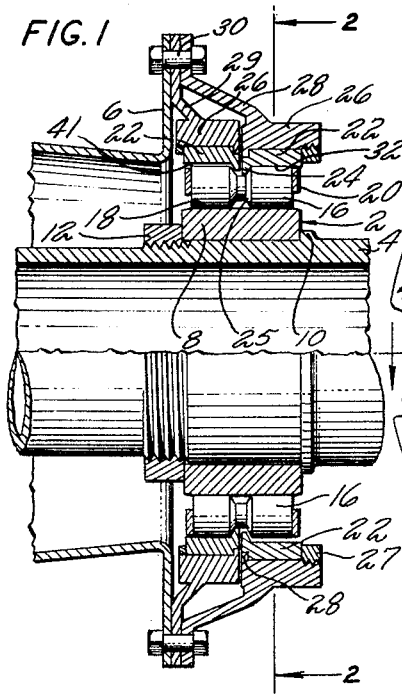
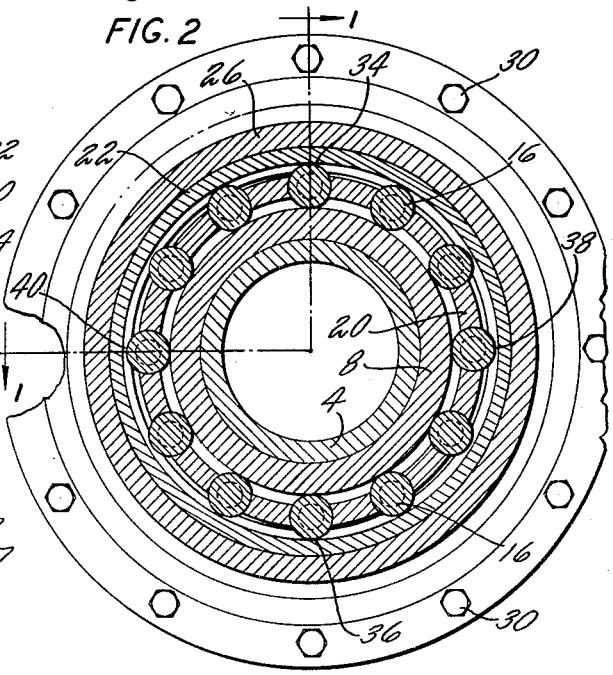
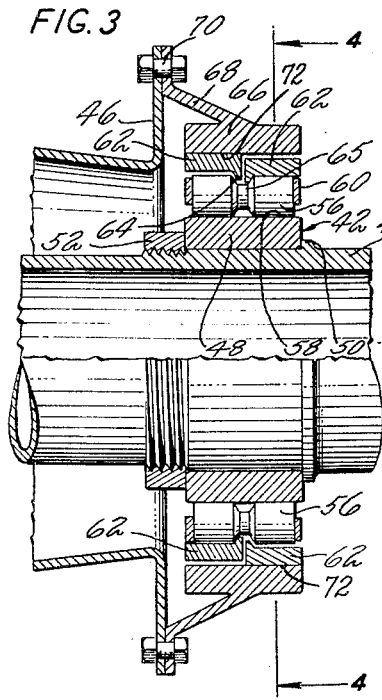
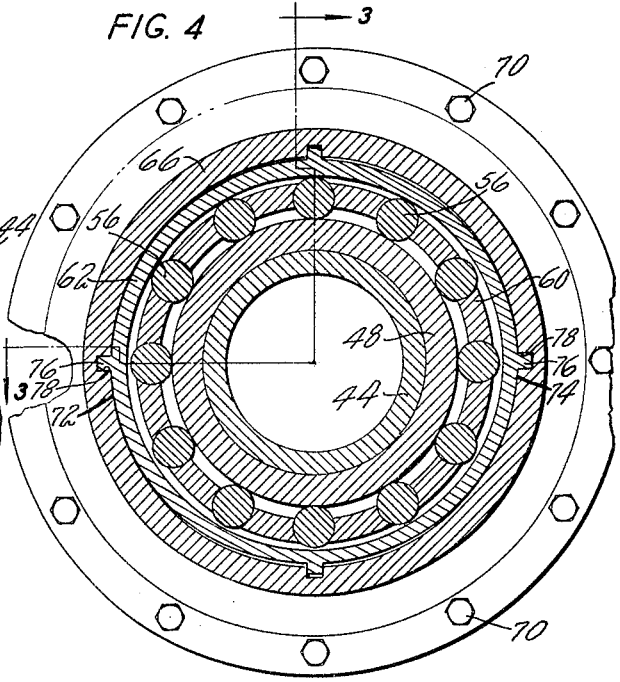
INVENTOR
GENO J. ANDREINI
BY
ATTORNEY //
United States Patent Office 2,916,336
Patented Dec. 8, 1959

2,916,336

PRELOADED ROLLER BEARINGS

Geno J. Andreini, Manchester, Conn., assignor to United Aircraft Corporation, East Hartford, Conn., a corporation of Delaware Application August 8, 1958, Serial No. 753,968

10 Claims. (Cl. 308—207)

This invention relates to anti-friction bearings and more specifically to roller bearings in which skidding of the individual rollers is minimized.

One arrangement for accomplishing this purpose is described in the co-pending Niles J. Brook application, Serial No. 409,424, filed February 10, 1954, for Skid Proof Bearing. In this application the skidding of the individual rollers is substantially eliminated by making the roller engaging surface of one of the races out-of-round and of such dimension that there is an interference fit between the rollers and the races at circumferentially spaced points. One feature of the present invention is a modification of this Brook device which will permit the preloading rollers at more than two circumferentially spaced points with a relatively simple bearing structure.

One feature of the invention is the making of one of the races, as for example, the outer race of a pair of rings in which each ring of the race has two or more high points and in which the rings of the race are indexed with respect to each other so as to produce four or more points of load application.

Other features and advantages will be apparent from the specification and claims, and from the accompanying drawings which illustrate an embodiment of the invention.

Fig. 1 is a sectional view through a bearing, the section being taken along the line 1—1 of Fig. 2, and the section represented by the horizontal portion of the line 1—1 forming the bottom half of the drawing of Fig. 1.

Fig. 2 is a transverse section through the bearing of Fig. 1 substantially along line 2—2 of Fig. 1, noting that the section at the bottom half of Fig. 1 is in Fig. 2 along the horizontal portion of line 1—1 of this figure.

Fig. 3 is a view similar to Fig. 1 showing a modification, the section being taken substantially along the line 3—3 of Fig. 4.

Fig. 4 is a transverse sectional view through the bearing of Fig. 3 substantially along the line 4—4 of Fig. 3.

The invention is shown in a bearing 2 which provides a support for a shaft 4 within a supporting housing 6. The bearing includes an inner race 8 clamped, for example, between a shoulder 10 on the shaft and a clamping ring 12. The bearing rollers 16 engage with and roll on the outer bearing engaging surface 18 on the race 8. The rollers are supported in circumferentially spaced relation to each other by a cage 20.

The set of rollers are surrounded by outer rings 22 which are arranged in side-by-side relation and each of which has inwardly projecting flanges 24 and which together form the outer race for the bearing. The flanges 24 are adjacent to each other and engage in a centrally located groove 25 in the roller. The two rings 22 together constitute a double outer race for the bearing construction and each ring has a part of the roller engaging surface for the outer race.

The rings 22 are separately supported by support rings 26 which surround the rings. The bearing rings may be a tight fit, or alternatively the rings 22 may be held as by a nut 27 holding the rings 22 against a shoulder 28. Each support ring has a projecting flange 29 thereon and the respective flanges 29 are secured as by bolts 30 to the housing 6. Each flange 29 provides a flexibility for the supporting ring 26 with respect to the housing 6 for a purpose which will hereinafter appear. The two support rings constitute a flexible support for the two bearing rings.

For the purpose of making sure that there is contact between the races and the rollers, at least at circumferentially spaced points, one of the races is made out-of-round so that the clearance between the inner and outer races at circumferentially spaced points will be an interference fit with the rollers. By interference fit is meant that the dimension between the roller engaging surface of the race to the points where the interference fit occurs is less than the diameter of the roller by, for example, from one to two thousandths of an inch per inch of diameter of the bearing. These spaced points of interference fit form cusps on the rings.

One method by which to produce the interference fit is described in the Brook application. This method is to distort one of the races, the two rings constituting the outer race in the arrangement shown, as by placing a jack inside each ring and spreading it into substantially an elliptical shape. The outer surface, that is the surface opposite to the roller engaging surface, is then machined to a cylinder while the ring is distorted by the jack so that when the jack is removed and the ring returns to its original shape, the outer surface is substantially elliptical.

This outer ring is then placed within the associated supporting ring 26. This supporting ring is rigid enough so that the cylindrical opening 32 therein which receives the bearing ring 22, as by a press fit, will hold the outer ring such that its outer surface is substantially cylindrical and the ring is distorted to produce an elliptical shape to the roller engaging surface. In this way, each ring is an interference fit with the rollers at diametrically spaced points. For example, the right-hand ring has its interference fit at the spaced points 34 and 36 and has a clearance at points 38 and 40 at 90° from the points 34 and 36.

The points of interference fit for the left-hand ring are circumferentially offset from the points of interference fit or cusps for the right-hand ring. Thus, as shown in Fig. 1, where the interference fit occurs at 34 (or 36) for the right-hand ring, the left-hand ring has clearance 41. Where the right-hand ring has clearance at 40 (or 38) the left-hand ring has an interference fit. In this way the bearing rollers encounter twice the number of interference fits for each revolution around the axis of the bearing as would be the case if only one outer ring were provided, thereby assuring a positive rotation of the rollers during substantially the complete revolution.

As clearly shown in Fig. 1, the groove in the roller provides for each ring 22 an axial length of roller engagement which is centrally located with respect to the ring so that no twisting forces are applied to the bearing rings as the rollers pass between them and the inner race.

The support rings 26 and the carrying flanges 28 are sufficiently flexible so that during bearing operation the outer race may be sprung slightly so that the rollers may be positioned between the races where the interference fit occurs and also so that the rollers may pass these points during bearing operation without stressing the rollers or the races enough to damage these parts. In producing an outer race in the manner above described, the roller engaging surface has previously been accurately machined to the usual dimension provided in the roller bearing to provide the normal fit between the rollers and the races. In this way when the out-of-roundness is then provided, the desired interference fit will exist.

Referring now to Figs. 3 and 4, the bearing 42 supports the shaft 44 within a supporting housing 46. The inner race 48 of the bearing is secured on the shaft as, for example, by being clamped between a shoulder 50 on the shaft and a threaded ring 52. Bearing rollers 56 engage with and roll on the outer bearing engaging surface 58 on the race 48. The rollers are supported in spaced circumferential relation by a cage 60.

The set of rollers 56 are surrounded by a pair of outer races 62 arranged in side-by-side relation. Each race has an inwardly projecting flange 64 and the flanges of the two races are adjacent to each other and engage in a centrally located groove 65 in each of the rollers. The two races 62 together constitute a double outer race for the bearing construction.

The races 62 are mounted within a support ring 66 which surrounds the races and which is connected to the supporting housing 46 by a flange or disc 68. This flange may be secured to the housing as by a ring of bolts 70.

For the purpose of making sure that there is contact between the races and the roller each of the races 62 is machined to an elliptical shape such that it has oppositely located high points on the outer diameter, as shown at 72 and 74, Fig. 4 and corresponding high points on the inner surface to produce a race of constant radial wall thickness. The right-hand race 62, which is the one shown in full line in Fig. 4, has the high points located horizontally to provide the interference fit, or cusps, on a vertical line. The left-hand race 62 is indexed so that its high points are offset 90° so that the high points for this race are on a vertical center line and the interference fit or cusps are located on a horizontal center line.

The finished dimension of the inner surface of the outer race is such that where the surface has the smallest radial dimension there will be an interference fit with the rollers to the same extent as in Figs. 1 and 2. Instead of building radial flexibility in the supporting ring 66, however, the radial flexibility is provided between the rings 62 and the supporting ring. The rings 62 may be held against rotation within the housing as by splines or keys 76 on the rings 62 which engage in grooves 78 in the surrounding ring 66.

In this arrangement as in the arrangement of Figs. 1 and 2, the flexibility of the rings 62 is such that these rings may be sprung slightly at their minimum radial dimension in order that the rolls and the inner race may be positioned within the outer races and also so that the rollers may pass these points of interference fit during bearing operation without stressing the rollers or surfaces of the races enough to damage these parts.

It is to be understood that the invention is not limited to the specifica embodiment herein illustrated and described, but may be used in other ways without departure from its spirit as defined by the following claims.

I claim:

1. A bearing construction including an inner race, an outer race, and rollers between said races and engaging a surface on each of said races, one of said races being made up of at least two adjacent rings in side-by-side relation, each ring including a part of the roller engaging surface of the race of which the ring is a part, each of said rings having its roller engaging surface out-of-round such that at a plurality of circumferentially spaced points the spacing between the roller engaging surface of said ring and the opposite surface of the other race is slightly less than the comparable dimension of the roller and the circumferentially spaced points on one of the rings being offset circumferentially from the spaced points on the adjacent ring.

2. A bearing construction including an inner race, an outer race, and rollers between said races and engaging a surface on each of said races, one of said races being made up of at least two adjacent rings in side-by-side relation, each ring including a part of the roller engaging surface of the race of which the ring is a part, each of said rings having its roller engaging surface out-of-round such that at a plurality of circumferentially spaced points the spacing between the roller engaging surface of said ring and the opposite surface of the other race is slightly less than the comparable dimension of the roller and the circumferentially spaced points on one of the rings being offset circumferentially from the spaced points on the adjacent ring, one of the races being resilient radially to permit distortion as the rollers pass said spaced points.

3. A bearing construction including an inner race, an outer race, and rollers between said races and engaging a surface on each of said races, one of said races being made up of at least two adjacent rings in side-by-side relation, each ring including a part of the roller engaging surface of the race of which the ring is a part, each of said rings having its roller engaging surface out-of-round such that at a plurality of circumferentially spaced points the spacing between the roller engaging surface of said ring and the opposite surface of the other race is slightly less than the comparable dimension of the roller and the circumferentially spaced points on one of the rings being offset circumferentially from the spaced points on the adjacent ring, each of said rings being resilient radially to permit distortion as the rollers pass said spaced points.

4. A bearing construction including an inner race, an outer race, and rollers between said races and engaging a surface on each of said races, one of said races being made up of at least two adjacent rings in side-by-side relation, each ring including a part of the roller engaging surface of the race of which the ring is a part, each of said rings having its roller engaging surface out-of-round such that at a plurality of circumferentially spaced points the spacing between the roller engaging surface of said ring and the opposite surface of the other race is slightly less than the comparable dimension of the roller and the circumferentially spaced points on one of the rings being offset circumferentially from the spaced points on the adjacent ring, each of the rollers being grooved and each of the rings having a flange engaging with the groove to locate the rollers axially with respect to the races.

5. A bearing construction including an inner race, an outer race, and rollers between said races and engaging a surface on each of said races, one of said races being made up of at least two adjacent rings in side-by-side relation, each ring including a part of the roller engaging surface of the race of which the ring is a part, each of said rings having its roller engaging surface out-of-round such that at a plurality of circumferentially spaced points the spacing between the roller engaging surface of said ring and the opposite surface of the other race is slightly less than the comparable dimension of the roller and the circumferentially spaced points on one of the rings being offset circumferentially from the spaced points on the adjacent ring, each of the rollers being grooved and each of the rings having a flange engaging with the groove to locate the rollers axially with respect to the races, the flanges on the rings being closely adjacent to each other and the groove in each of the rollers being substantially mid-way between the ends of the roller.

6. A bearing construction including an inner race, an outer race, and rollers between said races and engaging a surface on each of said races, one of said races including at least two rings in side-by-side relation, each ring including a part of the roller engaging surface of the race of which the ring is a part, each ring having its roller engaging surface out-of-round such that at a plurality of circumferentially spaced points there is an interference fit with the rollers, each ring having its circumferentially spaced points offset circumferentially with respect to the spaced points on the adjacent ring, each ring being individually resilient in a radial direction such that the ring may be distorted as the rollers pass said points.

7. A bearing construction including an inner race, an outer race, and rollers between said races and engaging a surface on each of said races, one of said races including at least two rings in side-by-side relation, each ring including a part of the roller engaging surface of the race of which the ring is a part, each ring having its roller engaging surface out-of-round such that at a plurality of circumferentially spaced points there is an interference fit with the rollers, each ring having its circumferentially spaced points offset circumferentially with respect to the spaced points on the adjacent ring, each ring being individually resilient in a radial direction such that the ring may be distorted as the rollers pass said points, said rings at their adjacent ends having projecting flanges thereon and said rollers having centrally located grooves for engagement by said flanges.

8. A bearing construction including an inner race, an outer race, and rollers between said races, said outer race being made up of at least two rings in side-by-side relation, each of said rings having its outer surface out-of-round and a supporting structure for said rings having a cylindrical recess to receive said rings, the dimensions and stiffness of said supporting structure being such that the rings will be distorted when assembled with the structure to produce a substantial cylindrical outer surface for each of said rings, and an out-of-round inner surface for each ring thereby presenting at least two cusps around the periphery of each ring, the cusps on one ring being circumferentially offset from the cusps on the other ring.

9. A bearing construction including an inner race and an inner structure supporting said race, an outer race and an outer structure supporting said outer race, and rollers between said races and adapted to roll therebetween as one of the races rotates relative to the other, said rollers engaging with an inner surface of said outer race and an outer surface of said inner race, and a cage supporting the rollers in circumferentially spaced relation and rotatable with respect to said races, one of said races including two separate rings in side-by-side relation, each ring including a part of the roller engaging surface for the race of which the ring is a part, each of said rings having its surface opposite to the roller engaging surface made out-of-round and the corresponding supporting surface for each of said rings being round such that when each out-of-round ring is mounted with its supporting structure the ring will be distorted to produce circumferentially spaced cusps on the roller engaging surface, the spacing between the roller engaging surface on each ring at said cusps being less than the corresponding dimension of the roller and the cusps on one of the rings being circumferentially offset from the cusps on the other ring.

10. A bearing construction including an inner race, an outer race, and rollers between said races and engaging a surface on each of said races, one of said races including at least two rings in side-by-side relation, each ring having a surface thereon forming a part of the roller engaging surface for the race of which the ring is a part, each ring having its roller engaging surface out-of-round and having its opposite surface similarly out-of-round such that at a plurality of circumferentially spaced points the spacing between the roller engaging surface of each of said rings and the other race is slightly less than the comparable dimension of the roller, the out-of-round rings being resilient such that the rings may be distorted to permit the rollers to pass said spaced points, the spaced points for one of said rings being circumferentially offset from the spaced points for the other ring and a supporting structure for said rings such that the supporting structure provides for the distortion of the rings.

References Cited in the file of this patent

UNITED STATES PATENTS 1,885,914    Heim                 Nov. 1, 1932

FOREIGN PATENTS 1,079,848    France               May 26, 1954
1,118,308    France               Mar. 12, 1956